United States Patent
Miyoshi et al.

(10) Patent No.: US 7,130,906 B2
(45) Date of Patent: Oct. 31, 2006

(54) DATA COMMUNICATING DEVICE AND DATA COMMUNICATING METHOD

(75) Inventors: Ryuta Miyoshi, Tokyo (JP); Yuji Ogihara, Chiba (JP); Tomomasa Kojo, Tokyo (JP)

(73) Assignee: Sony Corporation (JP)

( * ) Notice: Subject to any disclaimer, the term of this patent is extended or adjusted under 35 U.S.C. 154(b) by 967 days.

(21) Appl. No.: 10/127,620

(22) Filed: Apr. 22, 2002

(65) Prior Publication Data

US 2002/0168042 A1   Nov. 14, 2002

(30) Foreign Application Priority Data

Apr. 25, 2001 (JP) ............................ P2001-128039
Apr. 10, 2002 (JP) ............................ P2002-108379

(51) Int. Cl.
*G06F 15/173* (2006.01)
(52) U.S. Cl. ...................... 709/225; 709/231; 709/232; 709/233; 710/110
(58) Field of Classification Search .................. 710/52, 710/110, 306; 709/230, 249; 370/463, 465, 370/466, 503; 386/68; 348/554
See application file for complete search history.

(56) References Cited

U.S. PATENT DOCUMENTS

| | | | | |
|---|---|---|---|---|
| 5,933,430 A | * | 8/1999 | Osakabe et al. | 370/463 |
| 5,973,748 A | * | 10/1999 | Horiguchi et al. | 348/554 |
| 6,219,728 B1 | * | 4/2001 | Yin | 710/52 |
| 6,333,938 B1 | * | 12/2001 | Baker | 370/503 |
| 6,505,255 B1 | * | 1/2003 | Akatsu et al. | 709/239 |
| 6,546,419 B1 | * | 4/2003 | Humpleman et al. | 709/223 |
| 6,601,127 B1 | * | 7/2003 | Nomura et al. | 710/306 |
| 6,684,024 B1 | * | 1/2004 | Ono et al. | 386/68 |
| 6,757,743 B1 | * | 6/2004 | Tamori et al. | 709/249 |
| 6,868,451 B1 | * | 3/2005 | Peacock | 709/231 |
| 6,910,086 B1 | * | 6/2005 | Inoue et al. | 710/110 |
| 6,961,347 B1 | * | 11/2005 | Bunton et al. | 370/485 |

* cited by examiner

*Primary Examiner*—Hassan Kizou
*Assistant Examiner*—Albert T. Chou
(74) *Attorney, Agent, or Firm*—Lerner, David, Littenberg, Krumholz & Mentlik, LLP

(57) ABSTRACT

Reproduced time-continuous data is transmitted or discarded in units of a predetermined amount depending on a data processing status of another device connected via a network, whereby matching in temporal relationship with respect to data received by another device is realized.

22 Claims, 17 Drawing Sheets

FIG. 13

| 131 | 132 | 133 | 134 | 135 | 136 | 137 | 138 |
|---|---|---|---|---|---|---|---|
| On-line | Broadcast connection counter | Point-to-point connection counter | Reserved | Channel number | Data rate | Overhead ID | Payload |
| 1 | 1 | 6 | 2 | 6 | 2 | 4 | 10 |

FIG. 14

| 141 | 142 | 143 | 144 |
|---|---|---|---|
| Overhead ID | IEEE1394 bandwidth allocation units | Overhead ID | IEEE1394 bandwidth allocation units |
| 0000h | 512 | 1000h | 256 |
| 0001h | 32 | 1001h | 288 |
| 0010h | 64 | 1010h | 320 |
| 0011h | 96 | 1011h | 352 |
| 0100h | 128 | 1100h | 384 |
| 0101h | 160 | 1101h | 416 |
| 0110h | 192 | 1110h | 448 |
| 0111h | 224 | 1111h | 480 |

FIG. 15A

RAW PACKET

| Bytes | Raw Packet |
|---|---|
| 0 | FFC22190 |
| 4 | FFC3FFFF |
| 8 | F0000904 | ←—151
| 12 | 00080002 |
| 16 | EB048477 |
| 20 | 803F7C12 | ←—152 "0"
| 24 | 813E7C12 | ←—153 "1"
| 28 | 5D1693B6 |

FIG. 15B

DETAILS OF PACKET

| Destination ID | t l | rt | tcode | pri |
|---|---|---|---|---|
| 1111111111000010 | 001000 | 01 | 1001 | 0000 |
| Source ID | | | | |
| 1111111111000011 | 1111 1111 1111 1111 | | | |
| Destination Offset | | | | |
| 1111 0000 0000 0000 0000 1001 0000 0100 | | | | |
| Data length | Extended tcode | | | |
| 0000000000001000 | 0000 0000 0000 0000 0010 | | | |
| Header CRC | | | | |
| 1110 1011 0000 0100 1000 0100 0111 0111 | | | | |
| Data (arg value) | | | | |
| 1000 0000 0011 1111 0111 1100 0001 0010 | | | | |
| Data (data value) | | | | |
| 1000 0001 0011 1110 0111 1100 0001 0010 | | | | |
| Data CRC | | | | |
| 0101 1101 0001 0110 1001 0110 1011 0110 | | | | |

FIG. 16A

RAW PACKET

| Bytes | Raw Packet |
|---|---|
| 0 | FFC321B0 |
| 4 | FFC20000 |
| 8 | 00000000 |
| 12 | 00040002 |
| 16 | 82595879 |
| 20 | 803F7C12 |
| 24 | 48072738 |

FIG. 16B

DETAILS OF PACKET

| Destination ID | tl | rt | tcode | pri |
|---|---|---|---|---|
| 1111111111000011 | 001000 | 01 | 1101 | 0000 |
| Source ID | | | | |
| 1111111111000010 | 0000 0000 0000 0000 | | | |
| Destination Offset | | | | |
| 0000 0000 0000 0000 0000 0000 0000 0100 | | | | |
| Data length | Extended tcode | | | |
| 0000000000000100 | 0000 0000 0000 0000 0010 | | | |
| Header CRC | | | | |
| 1000 0010 0101 1001 0101 1000 0111 1001 | | | | |
| Data | | | | |
| 1000 0000 0011 1111 0111 1100 0001 0010 | | | | |
| Data CRC | | | | |
| 0100 1000 0000 0111 0010 0111 0011 1000 | | | | |

FIG. 18

| 181 | 182 | 183 | 184 | 185 | 186 | 187 | 188 |
|---|---|---|---|---|---|---|---|
| ZERO | Preamble | Parity | Channel | User | Validate | Aux | Sample |
| 00 | 01 | 0 | 0 | 0 | 0 | 0000 | 0000 0000 0000 0000 1111 1111 |

DATA COMMUNICATING DEVICE AND DATA COMMUNICATING METHOD

BACKGROUND OF THE INVENTION

1. Field of the Invention

The present invention relates to a data communicating device and a data communicating method in which time-continuously inputted transmission data is transmitted to another device or discarded in units of a predetermined data amount at intervals of a predetermined time depending on a data processing status of another device connected via a network.

2. Description of the Related Art

In IEEE1394 audio devices for transferring audio data via a network using interfaces in conformity with the IEE1394 standard, unless the receiving side gives transmission permission to the transmitting side, a device on the transmitting side cannot transfer data in the data transfer operation except for a broadcast data transfer mode in which data is transferred to all other devices.

Assuming a personal computer (PC) to be one IEEE1394 audio device, therefore, when the personal computer (PC) side issues an audio data transfer request but an IEEE1394 audio device on the receiving side does not give transmission permission, the data must be discarded on the personal computer (PC) side.

In conventional data transfer described above, however, the personal computer (PC) handles audio data as one set of packet data, and does not manage the data on the time base. Accordingly, when data transfer is disabled, the personal computer (PC) executes processing to discard all of the data, thus resulting in that data transfer is completed at the time different from the actual reproduction end time of the audio data. Stated otherwise, there has hitherto been a problem that audio data cannot be properly discarded.

In some cases, even when no audio data exists on the personal computer (PC) side, a data transfer request is issued from the IEEE1394 audio device. Conventionally, a dummy packet is sent to the receiving side in reply to the request. However, a certain task is required to reside on the personal computer (PC) side at all times for sending a dummy packet. Stated otherwise, the personal computer (PC) employs a part of limited resources to keep a task residing to execute processing that is not always required. A problem has been hence experienced in that resources cannot be effectively utilized.

SUMMARY OF THE INVENTION

In view of the state of the art set forth above, it is an object of the present invention to provide a data communicating device for transmitting time-continuous inputted data in units of a predetermined data amount to another device connected to a network, the device comprising a buffer unit for temporarily holding the time-continuous inputted data; a timer unit for reading data out of the buffer unit at intervals of a predetermined time; a communicating unit for inputting and outputting data with respect to the aforesaid another device via the network; a data holding unit enabling data held therein to be rewritten from the aforesaid another device via the communicating unit; a held-value determining unit for determining whether data held in the data holding unit is a predetermined value; and a control unit for discarding a predetermined amount of the time-continuous data held in the buffer unit at intervals of a time counted by the timer unit when the held-value determining unit determines that data held in the data holding unit is the predetermined value.

Another object of the present invention is to provide a data communicating method for transmitting time-continuous data, inputted to a buffer, in units of a predetermined data amount to another device connected to a network, the method comprising the steps of reading data from a data holding unit enabling data held therein to be rewritten from the aforesaid another device via the network; determining whether the read data is a predetermined value; and discarding a predetermined amount of the time-continuous data at intervals of a predetermined time from the buffer in which the time-continuous data is inputted and held, when the read data is determined to be the predetermined value.

With the data communicating device of the present invention, since the device comprises a buffer unit for temporarily holding data time-continuously reproduced; a timer unit for reading data out of the buffer unit at intervals of a predetermined time; a communicating unit for inputting and outputting data with respect to another device via a network; a data holding unit enabling data held therein to be rewritten from the aforesaid another device via the communicating unit; a held-value determining unit for determining whether data held in the data holding unit is a predetermined value; and a control unit for discarding a predetermined amount of the time-continuously reproduced data held in the buffer unit at intervals of a time counted by the timer unit when the held-value determining unit determines that data held in the data holding unit is the predetermined value, an advantage is obtained in that, on condition of making the data communicating device recognized as an audio device by the aforesaid another device, data can be discarded when the aforesaid another device cannot receive audio data because it does not give transmission permission, and the aforesaid another device can regard, through processing to enable data transfer, the data communicating device as having properly performed data transfer when data must be transmitted.

Also, in the data communicating device of the present invention, the control unit controls the communicating unit to transmit, to the aforesaid another device via the network, a predetermined amount of the time-continuously reproduced data held in the buffer unit at intervals of a time counted by the timer unit when the held-value determining unit determines that data held in the data holding unit is not the predetermined value. Therefore, an advantage is obtained in that, on condition of making the data communicating device recognized as an audio device by the aforesaid another device, audio data can be transmitted when the aforesaid another device gives transmission permission, by executing processing to be made when the aforesaid another device permits transmission of audio data.

Further, with the data communicating method of the present invention, since the method comprises the steps of reading data at intervals of a predetermined time from a data holding unit enabling data held therein to be rewritten from another device via a network; determining whether the read data is a predetermined value; and discarding a predetermined amount of time-continuously reproduced streaming data from a buffer in which the time-continuously reproduced streaming data is held, when the read data is determined to be the predetermined value, an advantage is obtained in that, on condition of making a data communicating device recognized as an audio device by the aforesaid another device, data can be discarded when the aforesaid another device cannot receive audio data because it does not give transmission permission, and the aforesaid another device can regard, through processing to enable data transfer, the data communicating device as having properly performed data transfer when data must be transmitted.

Also, the data communicating method of the present invention further comprises, when data read out of the data holding means is not the predetermined value, the steps of reading a predetermined amount of the streaming data out of the buffer, and transmitting the predetermined amount of the read streaming data to the aforesaid another device via the network. Therefore, an advantage is obtained in that, on condition of making the data communicating device recognized as an audio device by the aforesaid another device, audio data can be transmitted when the aforesaid another device gives transmission permission, by executing processing to be made when the aforesaid another device permits transmission of audio data.

Moreover, with the data communicating method of the present invention, when the read data is changed from the predetermined value to a status different from the predetermined value, silence data is transmitted for a predetermined time prior to transmission of the streaming data read out of buffer. Therefore, an advantage is obtained in that, on condition of making the data communicating device recognized as an audio device by the aforesaid another device, silence data can be added to the beginning in transmitting audio data when the aforesaid another device gives transmission permission, by executing processing to be made when the aforesaid another device permits transmission of audio data.

Additionally, in the data communicating method of the present invention, the time-continuously reproduced streaming data is audio data and/or video data. Therefore, an advantage is obtained in that, on condition of making a data communicating device recognized as an audio device by the aforesaid another device, audio data and/or video data can be discarded when the aforesaid another device cannot receive audio data and/or video data because it does not give transmission permission, and the aforesaid another device can regard, through processing to enable data transfer, the data communicating device as having properly performed data transfer when data must be transmitted.

BRIEF DESCRIPTION OF THE DRAWINGS

FIG. 13 is a table showing a register oPCR (ffff f000 0904h–ffff f000 097Ch) indicating an on-line, off-line, transfer-enabled and transfer-disabled state;

FIG. 14 is a table showing an overhead ID;

FIGS. 15A and 15B are tables showing a packet example (Lock Request Transaction) issued when an IEEE1394 audio device gives transmission permission to a PC; FIG. 15A represents a packet and FIG. 15B represents details of the packet;

FIGS. 16A and 16B are tables showing a packet example (Lock Request Transaction) issued when the PC replies to a transmission permission packet from the IEEE1394 audio device; FIG. 16A represents a packet and FIG. 16B represents details of the packet;

FIGS. 17A and 17B show an isochronous packet including a data section and used in one example of a command for changing an input source, in which FIG. 17A shows an isochronous packet format and FIG. 17B shows a CIP header format; and FIG. 18 is a table showing details of a data section of a command for changing an input source sent from the PC to the audio device.

DESCRIPTION OF THE PREFERRED EMBODIMENTS

A data transmitting device according to one embodiment of the present invention is intended to realize that, assuming a personal computer (PC) to be an imaginary IEEE1394 audio device, data can be properly discarded on the data transmitting device side when a receiving side device connected to an IEEE1394 network cannot receive data, and resources of the personal computer can be effectively utilized.

Figure 1:
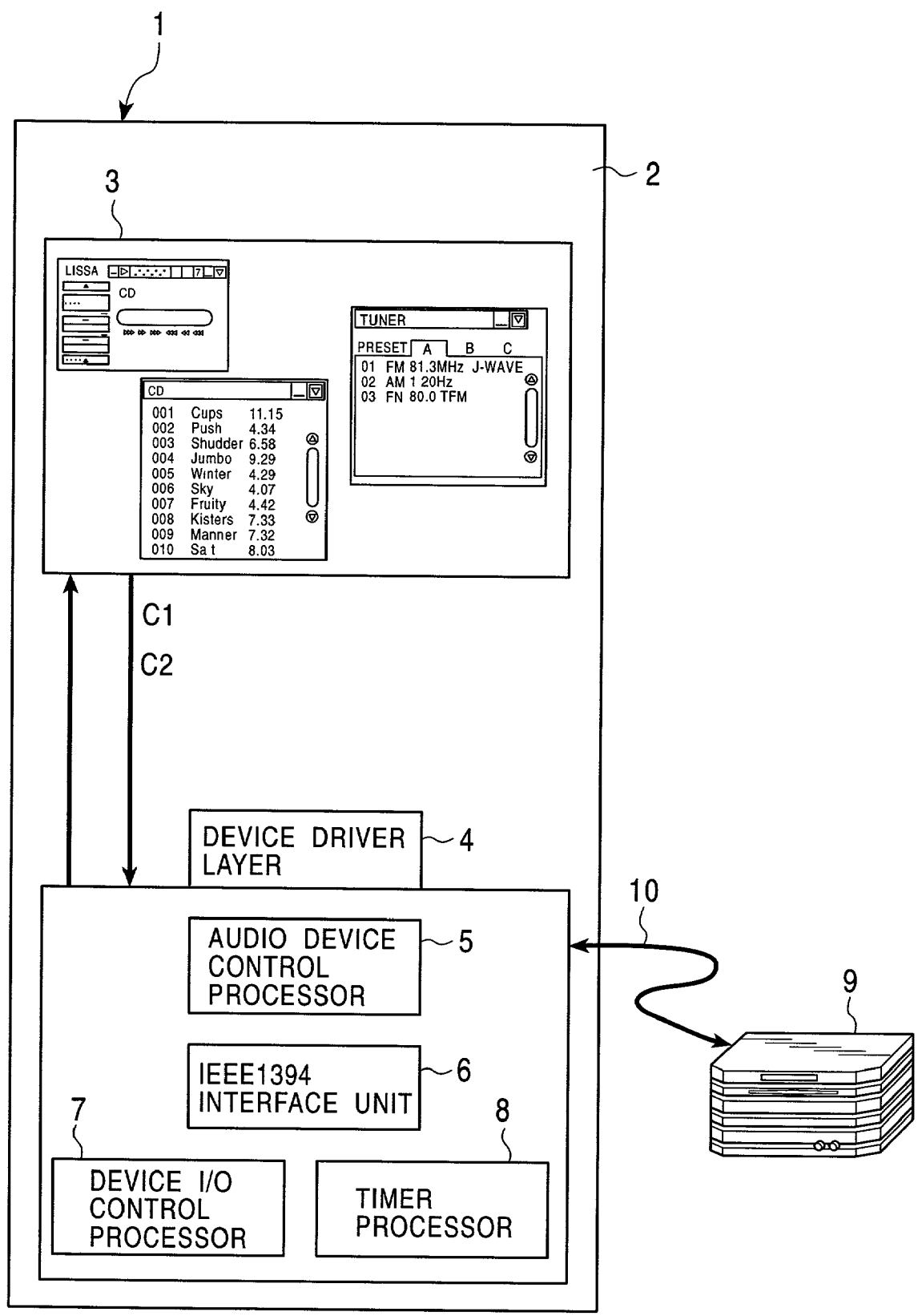
FIG. 1 is a block diagram showing a configuration of a data transmitting system employed in an embodiment of the present invention.

FIG. 1 is a block diagram showing a configuration of a data transmitting system employed in an embodiment of the present invention. In FIG. 1, the data transmitting system comprises a personal computer (PC) 1 for controlling the data transmitting system, an audio device 9 for reproducing audio data, and an IEEE1394 network 10 through which communication is performed in accordance with the IEEE1394 standard.

The personal computer 1 is able to run an application including an application layer 3 and a device driver layer 4.

The application layer 3 and the device driver layer 4 control the audio device 9 connected to the personal computer 1 via the IEEE1394 network 10 by transferring an audio device control C1 or a device I/O control C2 between the two layers.

The device driver layer 4 comprises an audio device control processor 5, an IEEE1394 interface unit 6, a device I/O control processor 7, and a timer processor 8.

Figure 2:
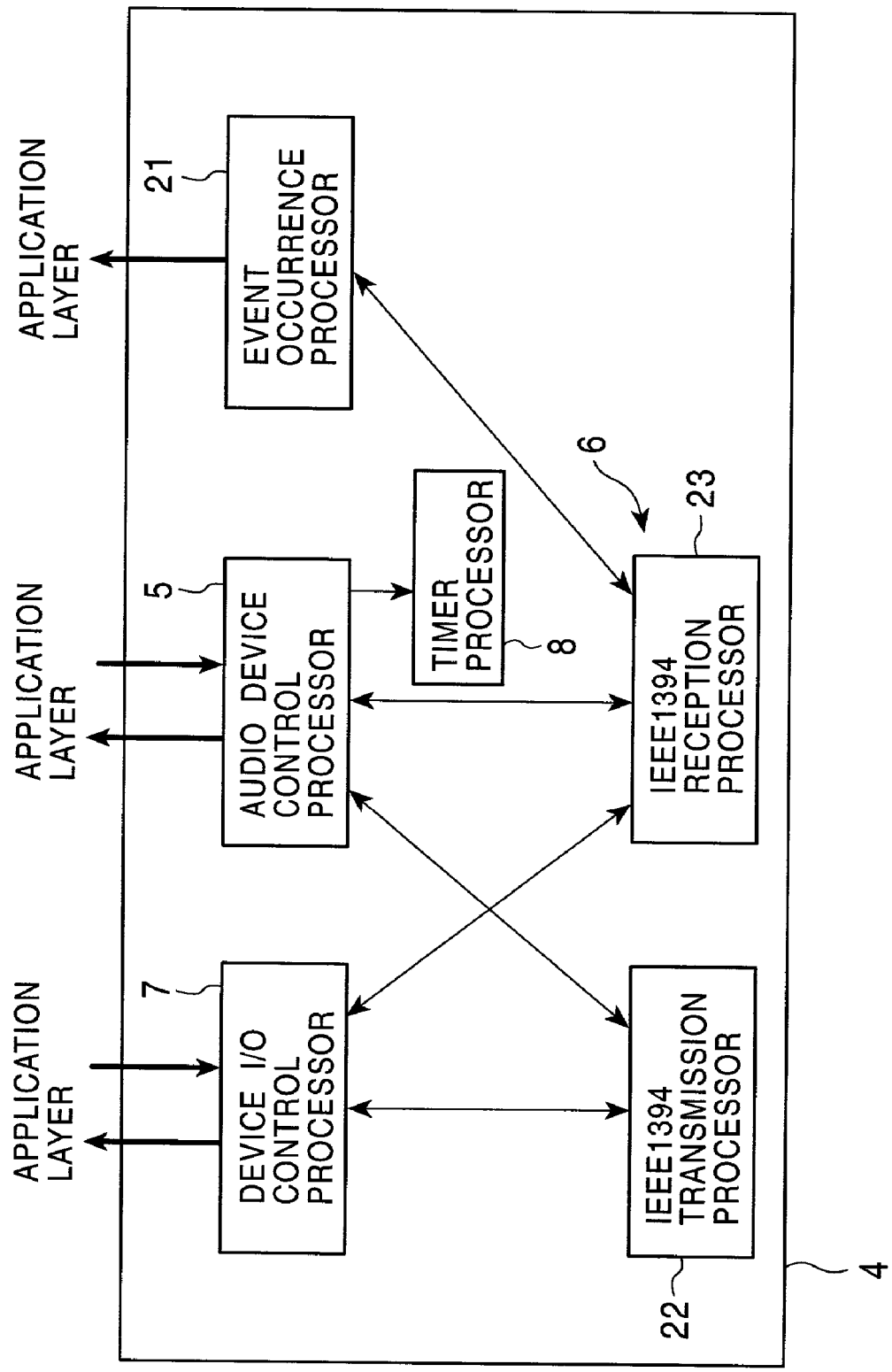
FIG. 2 is a block diagram showing details of a device driver layer.

FIG. 2 is a block diagram showing details of the device driver layer 4. In FIG. 2, the device driver layer 4 includes the audio device control processor 5 for transferring the audio device control C1 between itself and the application layer 3, the device I/O control processor 7 for transferring the device I/O control C2 between itself and the application layer 3, the timer processor 8 for executing timer processing in response to an instruction from the audio device control processor 5, and an event occurrence processor 21 for executing event occurrence processing with respect to the application layer 3.

The IEEE1394 interface unit 6 comprises an IEEE1394 transmission processor 22 and an IEEE1394 reception processor 23. The IEEE1394 transmission processor 22 executes transmission processing for both the device I/O control processor 7 and the audio device control processor 5. The IEEE1394 reception processor 23 executes reception processing for the device I/O control processor 7, the audio device control processor 5, and the event occurrence processor 21.

Figure 3:
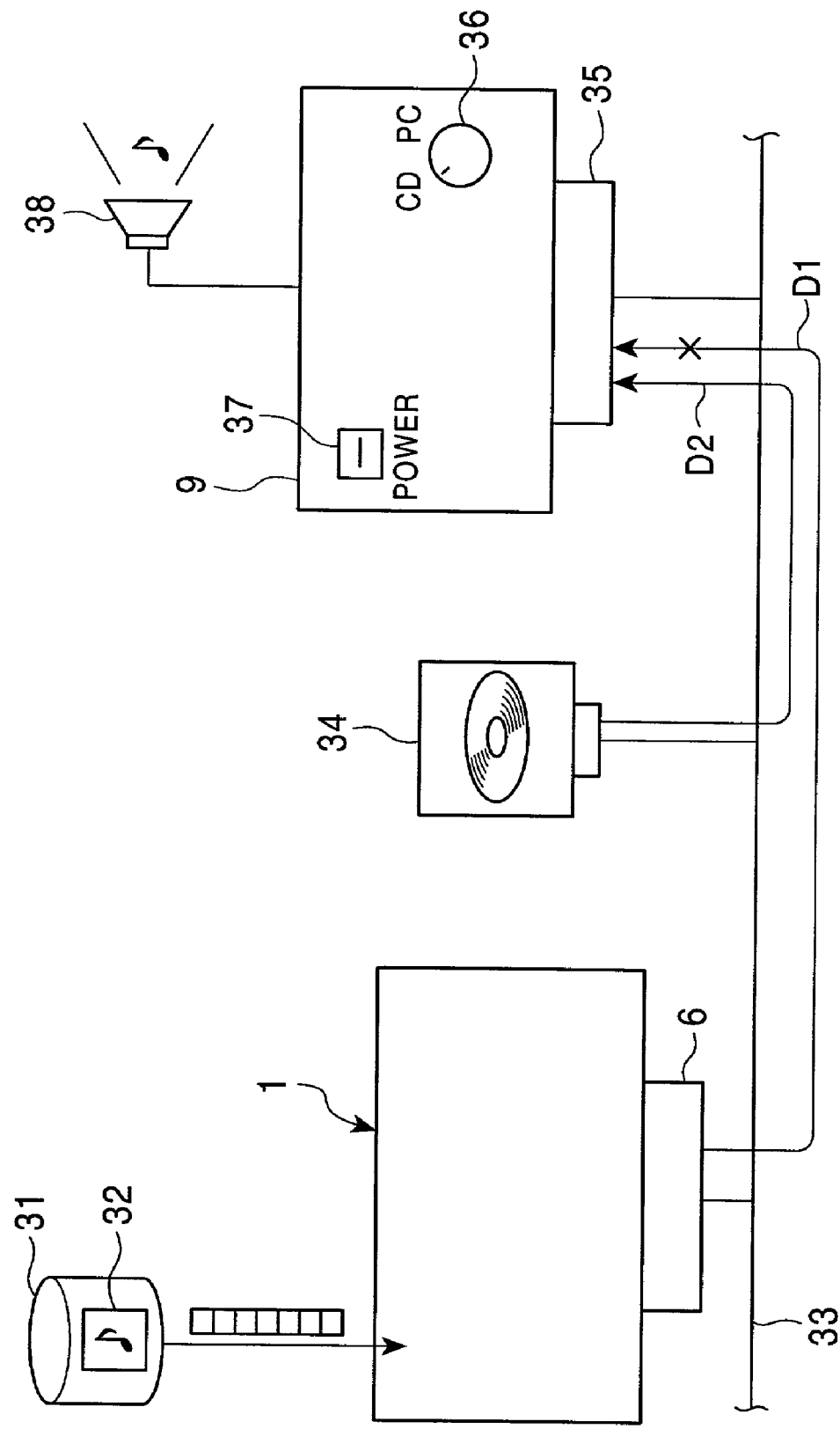
FIG. 3 is an illustration showing discard or transfer of data.

FIG. 3 is an illustration showing discard or transfer of data. FIG. 3 shows a condition in which a network 33 is connected to the personal computer 1 via the IEEE1394 interface (I/F) unit 6, to a compact disk (CD) player 34, and to the audio device 9 via an IEEE1394 interface (I/F) unit 35. With that arrangement, the audio device 9 is rendered to recognize the personal computer 1 as an imaginary IEEE1394 audio device, looking from driver software.

In the illustrated condition, a power supply of the audio device 9 is turned on with manipulation of a power switch 37, and the compact disk player 34 is selected by a switch 36. Then, audio data D2 is outputted from the compact disk player 34 to the audio device 9 via the network 33. As a result, an audio signal played back from the compact disk player 34 is outputted from a speaker 38 as a reproduced sound.

In that condition, an audio signal recorded on a hard disk 31 connected to the personal computer 1 cannot be reproduced from the audio device 9. This is because the audio device 9 cannot receive audio data D1 in a file 32 from a hard disk 31 of the personal computer 1 at that time. In that condition, as described later, processing is executed to be able to discard or transfer audio data on the personal computer 1 side.

With that processing, when the personal computer 1 must transmit data in the condition where the audio device 9 recognizes the personal computer 1 as an IEEE1394 audio device, the personal computer 1 can properly perform data transfer.

Also, when the audio data D1 does not exist on the personal computer 1 side in spite of the personal computer 1 being selected by the switch 36 and the audio device 9 requesting the audio data D1 to the personal computer 1, processing to be executed in the absence of data is executed.

With that processing, when the audio device 9 requests the audio data D1 to the personal computer 1 in the condition where the audio device 9 recognizes the personal computer 1 as an IEEE1394 audio device, the processing to be executed in the absence of data can be executed.

Figure 4:
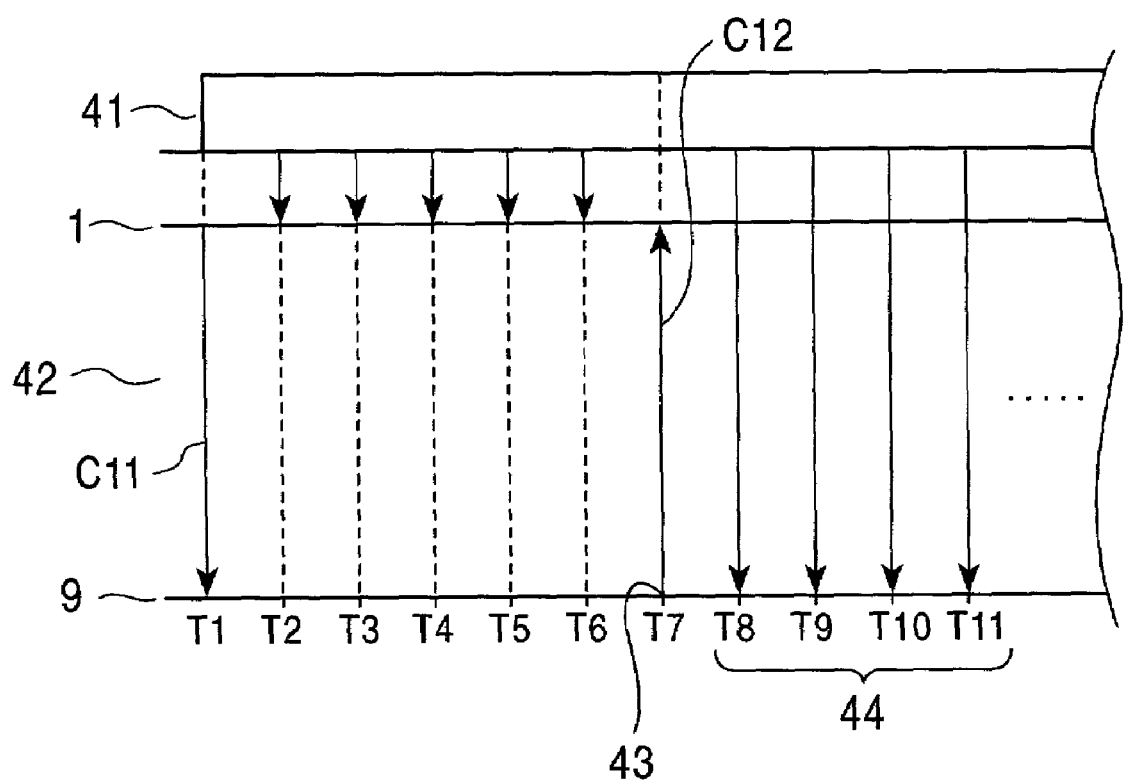
FIG. 4 is a chart showing timing of data transmission.

FIG. 4 is a chart showing timing of data transmission. In FIG. 4, at time T1, a signal C11 for inquiring whether the audio device 9 is in a ready state is transmitted from the personal computer 1 to the audio device 9 via the IEEE1394 interface unit 42. During a period from time T2 to T6, streaming data is successively inputted to the personal computer 1 from a streaming data input unit 41. However, no data is transmitted from the personal computer 1 to the audio device 9 during the period from time T2 to T6 because the audio device 9 is in the state incapable of receiving any data during that period.

At time T7, an event occurs, as indicated by 43, in the audio device 9, and a signal C12 is transmitted upon the event occurrence 43 to the personal computer 1 from the audio device 9. In this case, the signal C12 represents that the audio device 9 is ready for starting communication. The event occurrence 43 is caused, for example, when the audio device 9 is switched from the condition in which the compact disk player 34 is selected by the switch 36 to the condition in which the personal computer 1 is selected by the switch 36, or when the power supply is turned on with manipulation of the power switch 37.

Accordingly, in a subsequent period from time T8 to T11 and thereafter, streaming data successively inputted to the personal computer 1 from the streaming data input unit 41 is transmitted from the personal computer 1 to the audio device 9 via the IEEE1394 interface unit 42. The transmitted data is reproduced, as indicated by 44, in the audio device 9.

Figure 5:
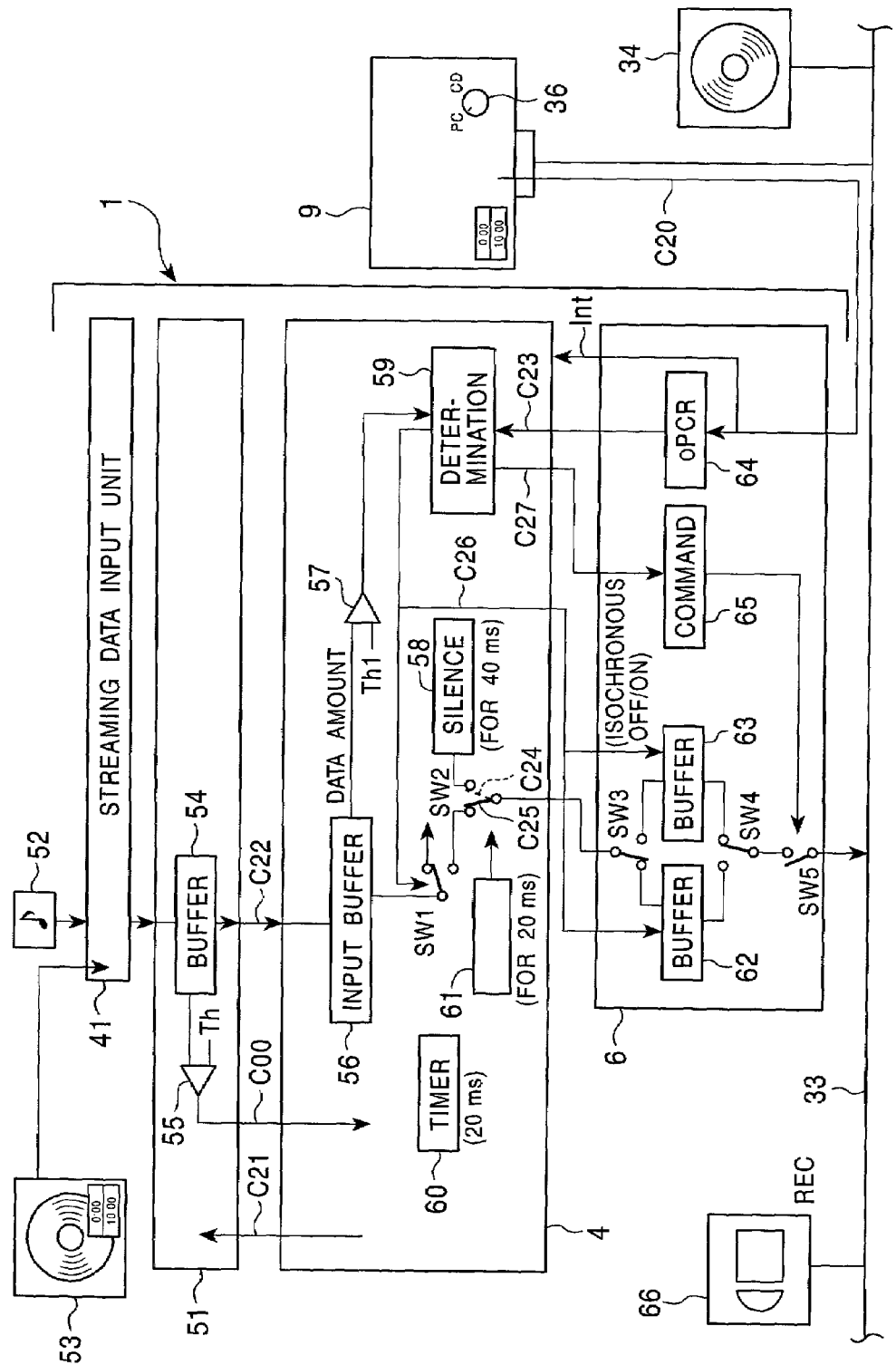
FIG. 5 is a block diagram showing control for discard or transfer of data.

FIG. 5 is a block diagram showing control for discard or transfer of data. FIG. 5 shows a condition in which the network 33 is connected to the personal computer 1 via the IEEE1394 interface unit 6, the compact disk player 34, the audio device 9, and a mini disk (MD) recording/playback device 66.

Also, the personal computer 1 comprises a streaming data input unit 41, an operating system (OS) 51, the device driver layer 4, and the IEEE1394 interface (I/F) unit 6.

Inputted to the streaming data input unit 41 are streaming data 52 or audio data from an audio CD 53. The data inputted to the streaming data input unit 41 is supplied to the OS 51.

The OS 51 comprises a buffer 54 for accumulating data and a comparator 55 for comparing a threshold Th with an amount of data accumulated in the buffer 54.

The comparator 55 of the OS 51 compares the threshold Th with the amount of data accumulated in the buffer 54, and supplies a start signal C00 to the device driver layer 4 when the amount of data accumulated in the buffer 54 exceeds the threshold Th. On the other hand, when the amount of data accumulated in the buffer 54 does not exceed the threshold Th as a result of comparing the threshold Th with the amount of data accumulated in the buffer 54, the comparator 55 of the OS 51 supplies a stop signal C00 to the device driver layer 4.

The device driver layer 4 comprises an input buffer 56, a comparator 57 for comparing a threshold Th1 with an amount of data accumulated in the input buffer 56, a switch SW1 for switching over discard and transfer of data, a silence data generator 58, a switch SW2 for switching over silence data and transfer data, a determination unit 59 for determining whether data is to be discarded, a timer 60 for counting a predetermined time, and a switching-over unit 61 for changing over the switch SW2 at intervals of a predetermined time. In this embodiment, the predetermined time is set to 20 msec.

The IEEE1394 interface unit 6 comprises switches SW3, SW4 for alternately switching over the transfer data, buffers 62, 63 for accumulating the transfer data, an oPCR (output Plug Control Register) 64 representing an output plug, a command generator 65 for generating a transfer command, and a switch SW5 for controlling transfer timing.

A description is now made of the operation executed to control discard or transfer of data in the device driver layer 4 and the IEEE1394 interface unit 6 constructed as described above.

When a predetermined change in status occurs inside the audio device 9, a data rewrite signal C20 is supplied from the audio device 9 to the oPCR 64 of the IEEE1394 interface unit 6 via the network 33. The data rewrite signal C20 serves as an interrupt request signal Int for the device driver layer 4. The device driver layer 4 executes interrupt processing in accordance with the interrupt request signal Int. With the interrupt processing, a data request signal C21 is supplied from the device driver layer 4 to the OS 51.

Variable block length data is supplied from the buffer 54 of the OS 51 to the input buffer 56 of the device driver layer 4. The variable block length data is, e.g., 16-bit data with 44.1 KHz sampling/2 ch (channels) and does not include time information. The comparator 57 compares the threshold Th1 with the amount of data accumulated in the input buffer 56, and delivers an output signal to the determination unit 59 of the device driver layer 4 when the amount of data accumulated in the input buffer 56 exceeds the threshold Th1.

A register value C23 is supplied from the oPCR 64 of the IEEE1394 interface unit 6 to the determination unit 59 of the device driver layer 4. The determination unit 59 determines based on the register value C23 whether data is to be discarded, and supplies a discard command C26 to the switch SW1. Depending on the presence or absence of the discard command C26, the switch SW1 switches over discard and transfer of data.

The switching-over unit 61 changes over the switch SW2 between a state C25 and a state C24 at intervals of 20 msec with the timer 60 for counting 20 msec. When the switch SW2 is in the state C25, the transfer data side is selected, and when it is in the state C24, the silence data output side is selected. In this embodiment, the silence data generator 58 generates silence data corresponding to a time of 40 msec. With the operation described above, the switch SW2 selectively switches over data outputted from the device driver layer 4 between silence data and transfer data.

The transfer data or the silence data is alternately accumulated in the dual buffers 62, 63 through the switch SW3, and is alternately outputted from the dual buffers 62, 63 through the switch SW4. Also, the determination unit 59 determines based on the register value C23 whether data is to be discarded, and supplies the discard command C26 to each of the dual buffers 62, 63. Depending on the presence or absence of the discard command C26, the dual buffers 62, 63 discard or transfer data.

Further, the determination unit 59 determines based on the register value C23 whether data is to be transferred, and supplies a transfer command C27 to the command generator 65. The command generator 65 generates a data transfer run command and supplies it to the switch SW5. In accordance with the data transfer run command, the switch SW5 executes the data transfer at predetermined timing. Thus, the operation for control of discard or transfer of data is performed in the personal computer 1.

Figure 6:
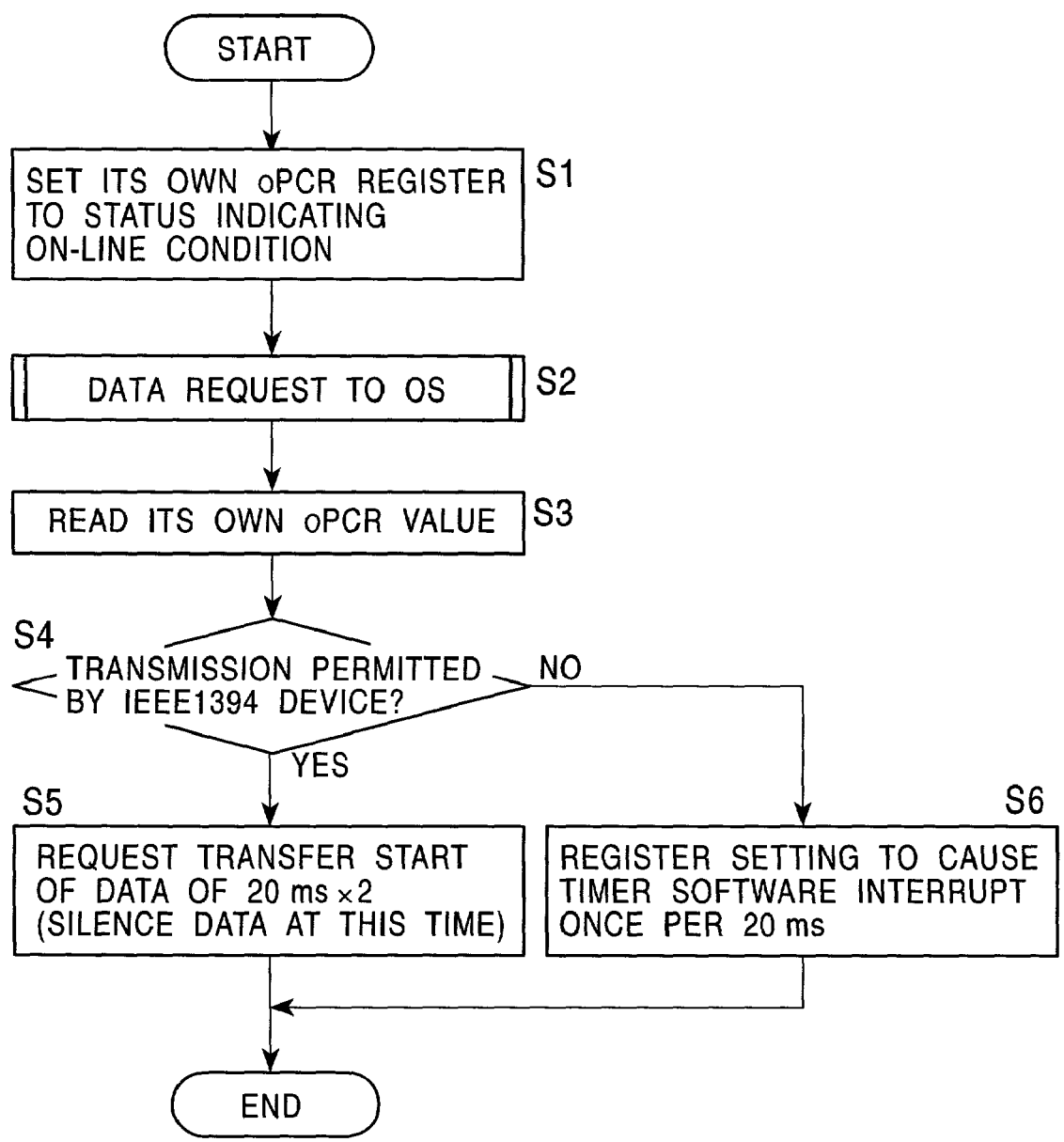
FIG. 6 is a flowchart showing operation of a data transfer start commanding section.

FIG. 6 is a flowchart showing operation of a data transfer start commanding section. Note that FIG. 6 shows operation of the data transfer start commanding section in the determination unit 59 of the device driver layer 4 in the condition in which the start signal C00 indicating the transfer start is outputted from the OS 51 in FIG. 5.

Referring to FIG. 6, in step S1, its own oPCR is set to a status indicating an on-line state. More specifically, the register value C23 of the oPCR 64 of the device driver layer 4 shown in FIG. 5 is set to a value "1" indicating an on-line state.

In step S2, data output is requested to OS. More specifically, the data request signal C21 is supplied from the device driver layer 4 to the OS 51 shown in FIG. 5.

In step S3, a value of its own oPCR is read. More specifically, the determination unit 59 of the device driver layer 4, shown in FIG. 5, reads the register value C23 set in the oPCR 64, which indicates point-to-point connection. Note that point-to-point connection is also called peer-to-peer connection.

In step S4, it is determined whether an IEEE1394 device permits transmission. More specifically, based on the register value C23 set in the oPCR 64 of the device driver layer 4 shown in FIG. 5, which indicates point-to-point connection, the determination unit 59 determines whether the IEEE1394 device permits transmission. The point-to-point connection indicated by the register value C23 represents not only whether the IEEE1394 device is able to perform 1:1 communication, but also a communication channel to be used when there are plurality of communication channels.

If the IEEE1394 device permits transmission in step S4, the transfer start of data of 20 msec×2 is requested in step S5. At this time, however, silence data is transferred. More specifically, the switching-over unit 61 of the device driver layer 4, shown in FIG. 5, changes over the switch SW2 to the silence data output side as indicated by C24. Then, the silence data generator 58 generates silence data corresponding to a time of 40 msec. That operation of transmitting silence data is required for the reason given below. At the beginning of reception, the receiving device side determines whether data is properly received or not. Therefore, the receiving device side cannot process data during a determination period. If effective data is sent from the beginning of data transmission, sounds would not be played back near the start point of playback when the sent data is audio data. Thus, the occurrence of failure in reproduction of necessary data is suppressed by sending silence data, which does not cause a problem even if not played back, prior to the start of transmission of the objective audio data.

If the IEEE1394 device does not permit transmission in step S4, setting to cause a timer software interrupt once per 20 msec is registered in step S6. More specifically, by using the 20-msec timer 60 of the device driver layer 4 shown in FIG. 5, the switching-over unit 61 changes over the switch SW2 between the transfer data side indicated by C25 and the silence data output side indicated by C24 at intervals of 20 msec. Correspondingly, the switch SW2 switches over the silence data and the transfer data.

Figure 7:
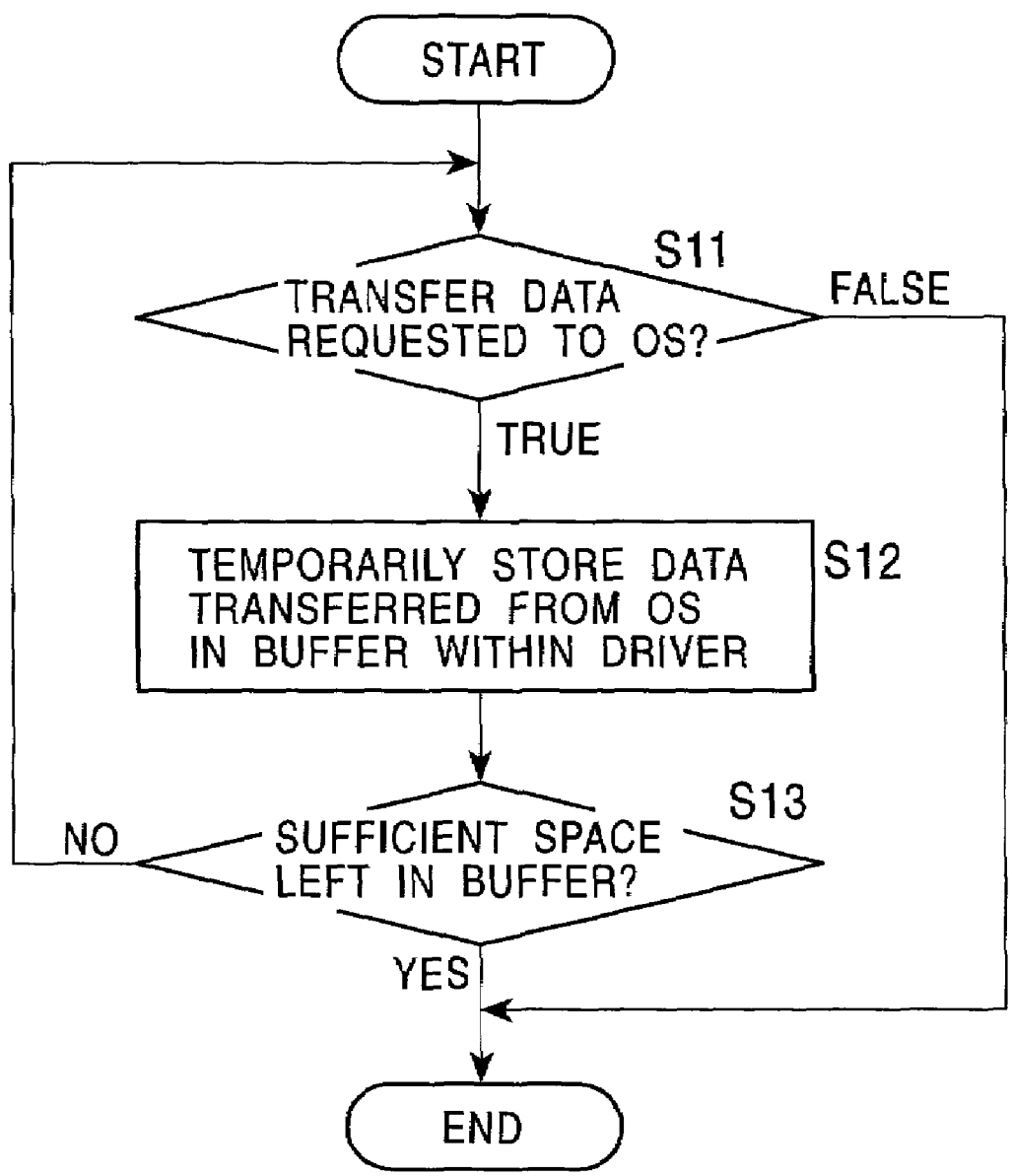
FIG. 7 is a flowchart showing operation of a routine for a data request to OS.

FIG. 7 is a flowchart showing operation of a routine for a data request to OS from the device driver layer 4. Referring to FIG. 7, in step S11, it is determined whether there is a transfer data request to OS. More specifically, it is determined whether the data request signal C21 is supplied from the device driver layer 4 to the OS 51 shown in FIG. 5.

If there is no transfer data request to OS in step S11, the process flow is brought into an end at once. If there is a transfer data request to OS in step S11, data transferred from OS is temporarily accumulated in a buffer of a device driver in step S12. More specifically, variable block length data is supplied from the buffer 54 of the OS 51 to the input buffer 56 of the device driver layer 4 shown in FIG. 5.

In step S13, it is determined whether there is a sufficient space left in the buffer. If there is a sufficient space left in the buffer, the process flow is brought into an end, and if there is not a sufficient space left in the buffer, the process flow returns to step S11. More specifically, the comparator 57 shown in FIG. 5 compares the threshold Th1 with the amount of data accumulated in the input buffer 56, and delivers an output signal to the determination unit 59 of the device driver layer 4 when the amount of data accumulated in the input buffer 56 exceeds the threshold Th1.

Figure 8:
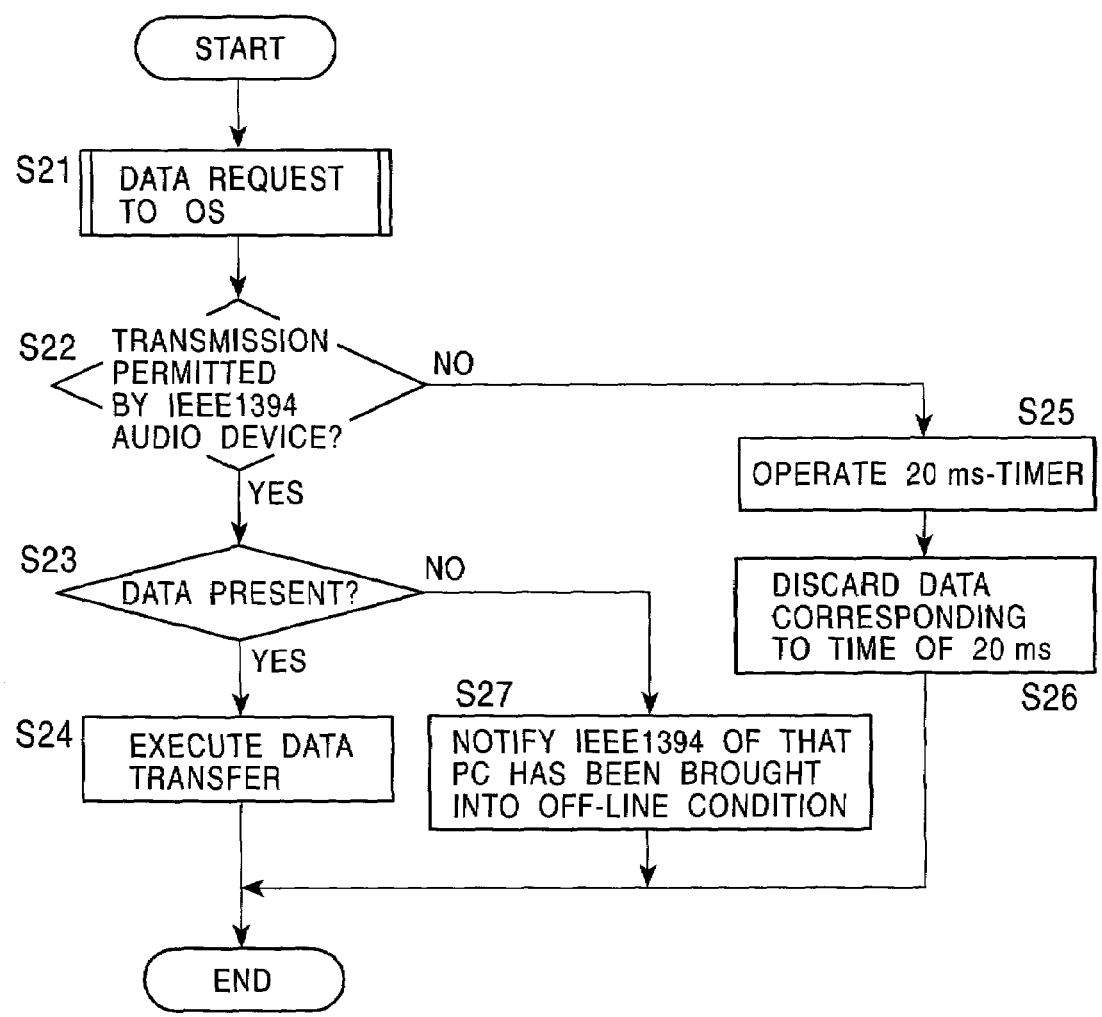
FIG. 8 is a flowchart showing processing to be executed upon a data transfer request from the PC (personal computer) side or upon a software interrupt indicating completion of data transfer.

FIG. 8 is a flowchart showing processing to be executed in the device driver layer 4 upon a data transfer request from the application layer 3 side of the personal computer (PC) or upon a software interrupt indicating completion of data transfer.

Referring to FIG. 8, in step S21, the device driver layer 4 requests a data transfer to OS. More specifically, the data request signal C21 is supplied from the device driver layer 4 to the OS 51 shown in FIG. 5.

In step S22, the device driver layer 4 determines whether an IEEE1394 device permits transmission. More specifically, based on the register value C23 set in the oPCR 64, which indicates point-to-point connection, the determination unit 59 of the device driver layer 4 shown in FIG. 5 determines whether the IEEE1394 device permits transmission.

If the IEEE1394 device permits transmission in step S22, it is determined in step S23 whether there is data requested for transmission. More specifically, the determination unit 59 of the device driver layer 4 shown in FIG. 5 determines whether data is present in the input buffer 56.

If data is present in step S23, data transfer is executed in step S24. More specifically, the determination unit 59 of the device driver layer 4 shown in FIG. 5 determines based on the register value C23 whether data is to be transferred, and supplies the transfer signal C27 to the command generator 65. The command generator 65 generates a data transfer run command and supplies it to the switch SW5. In accordance with the data transfer run command, the switch SW5 executes the data transfer at predetermined timing.

If the IEEE1394 device does not permit transmission in step S22, the 20-msec timer is operated in step S25. More specifically, the 20-msec timer 60 of the device driver layer 4 shown in FIG. 5 starts counting a time of 20 msec.

In step S26, data corresponding to a time of 20 msec is discarded from the input buffer 56 during the counting by the 20-msec timer 60. More specifically, the determination unit 59 of the device driver layer 4 shown in FIG. 5 determines based on the register value C23 whether data is to be discarded, and supplies the discard command C26 to the switch SW1. In accordance with the discard command C26, data is discarded through the switch SW1 so that the data is not transferred to the IEEE1394 I/F unit 6. Also, the determination unit 59 determines based on the register value C23 whether data is to be discarded, and supplies the discard command C26 to each of the dual buffers 62, 63. When the discard command C26 is applied, the dual buffers 62, 63 discard the data accumulated in those buffers.

If data is not present in step S23, the fact that the PC has been brought into an off-line state is reported to the IEEE1394 audio device in step S27. More specifically, the register value C23 set in the oPCR 64 of the device driver layer 4 shown in FIG. 5 is rewritten so as to indicate the off-line state.

Figure 9:
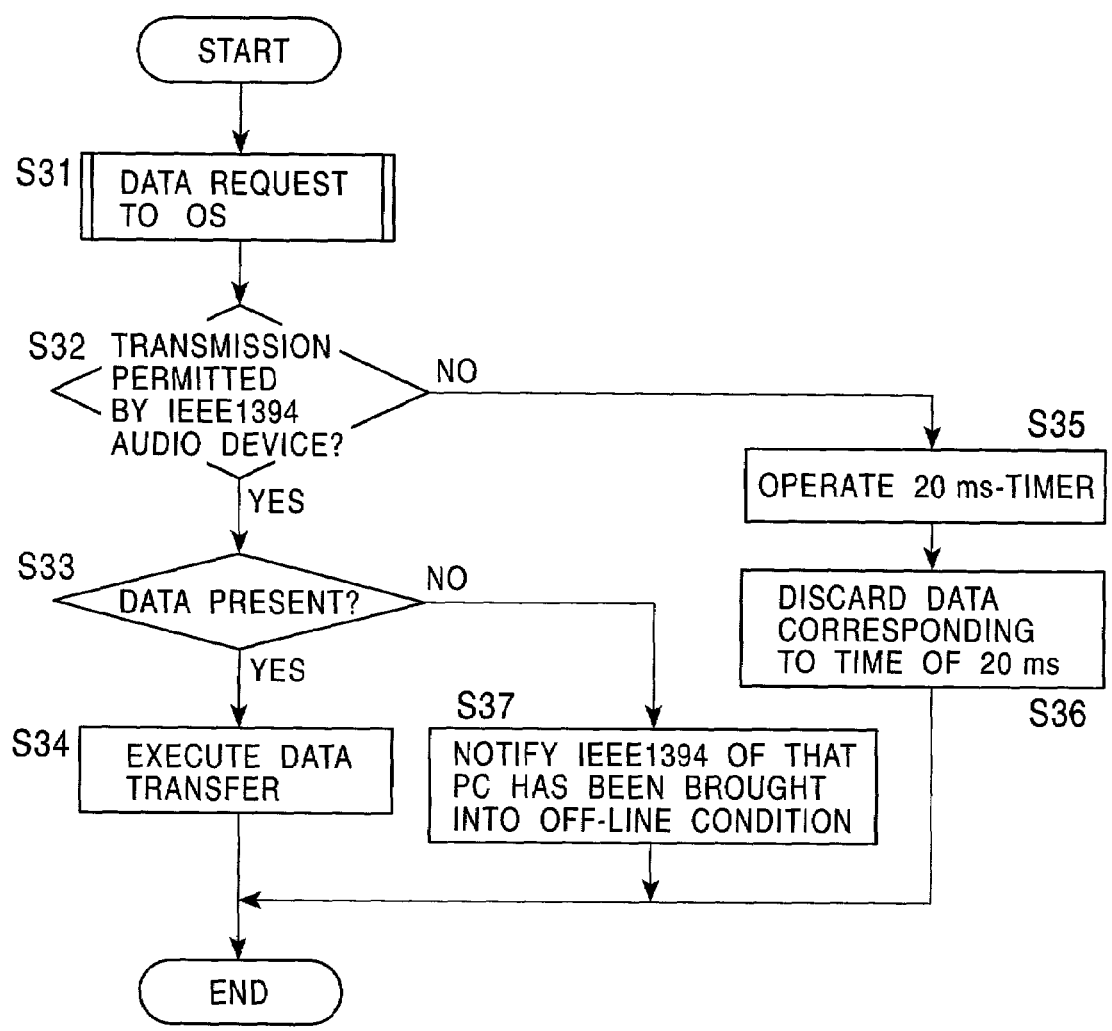
FIG. 9 is a flowchart showing processing to be executed upon a timer software interrupt.

FIG. 9 is a flowchart showing processing to be executed upon a timer software interrupt. In other words, FIG. 9 shows operation in the case of executing the timer software interrupt at intervals of 20 msec with the 20-msec timer 60 of the device driver layer 4 shown in FIG. 5.

Referring to FIG. 9, in step S31, data transfer is requested to OS. More specifically, the data request signal C21 is supplied from the device driver layer 4 to the OS 51 shown in FIG. 5.

In step S32, it is determined whether an IEEE1394 device permits transmission. More specifically, based on the register value C23 set in the oPCR 64, which indicates point-to-point connection, the determination unit 59 of the device driver layer 4 shown in FIG. 5 determines whether the IEEE1394 device permits transmission.

If the IEEE1394 device permits transmission in step S32, it is determined in step S33 whether there is data to be transmitted. More specifically, the determination unit 59 of the device driver layer 4 shown in FIG. 5 determines whether data is present in the input buffer 56.

If data is present in the input buffer 56 in step S33, data transfer is executed in step S34. More specifically, the determination unit 59 of the device driver layer 4 shown in FIG. 5 determines based on the register value C23 whether data is to be transferred, and supplies the transfer signal C27 to the command generator 65. The command generator 65 generates a data transfer run command and supplies it to the switch SW5. In accordance with the data transfer run command, the switch SW5 executes the data transfer at predetermined timing.

If the IEEE1394 device does not permit transmission in step S32, the 20-msec timer is operated in step S35. More specifically, the 20-msec timer 60 of the device driver layer 4 shown in FIG. 5 starts counting a time of 20 msec.

In step S36, data corresponding to a time of 20 msec is discarded from the input buffer 56 during the counting by the 20-msec timer 60. More specifically, the determination unit 59 of the device driver layer 4 shown in FIG. 5 determines based on the register value C23 whether data is to be discarded, and supplies the discard command C26 to the switch SW1. In accordance with the discard command C26, data is discarded through the switch SW1 so that the data is not transferred to the IEEE1394 I/F unit 6. Also, the determination unit 59 determines based on the register value C23 whether data is to be discarded, and supplies the discard command C26 to each of the dual buffers 62, 63. When the discard command C26 is applied, the dual buffers 62, 63 discard the data accumulated in those buffers.

If data is not present in step S33, the fact that the PC has been brought into an off-line state is reported to the IEEE1394 audio device in step S37. More specifically, the register value C23 set in the oPCR 64 of the device driver layer 4 shown in FIG. 5 is rewritten so as to indicate the off-line state.

As described above, if the IEEE1394 device does not permit transmission in step S22 of FIG. 8, the processing to discard audio data along the time base of audio transfer is executed in step S26. Also, if the IEEE1394 device does not permit transmission in step S32 of FIG. 9, the processing to discard audio data along the time base of audio transfer is executed in step S36.

Thus, because of data being discarded along the time base, when data transfer is enabled during transfer of audio data, it is possible to execute proper data transfer along the time base.

In that connection, discard of data can be executed by utilizing the timer available in the personal computer (PC) or the interrupt indicating the completion of data transfer, as described above.

When utilizing the timer in the personal computer (PC), a timer interrupt occurs along the time base, and data corresponding to a set time is discarded.

Accordingly, audio data is discarded along the time base of audio transfer, and hence discard of data can be properly performed.

Also, when utilizing a data transfer interrupt, data is transferred in the form of broadcast transfer. In transfer of IEEE1394 audio data, since data can be transferred only at certain intervals, data transfer can be performed along the certain time base.

Therefore, data in amount transferable for a certain interval can be discarded upon a software interrupt indicating the completion of data transfer. However, because the broadcast transfer is utilized, there is a possibility that the channel under use may be taken by another device. In such a case, the channel must be changed to a different one from that taken by another device.

Further, as described above, if data to be transmitted is not present in the input buffer in step S23 of FIG. 8, reporting is executed in step S27 to notify the IEEE1394 audio device of the fact that the PC has been brought into an off-line state. Similarly, if data to be transmitted is not present in the input buffer in step S33 of FIG. 9, reporting is executed in step S37 to notify the IEEE1394 audio device of the fact that the PC has been brought into an off-line state.

Thus, the IEEE1394 audio device has a mechanism for informing the device status to another device mutually. By utilizing that mechanism, the fact that the PC has been brought into the off-line condition is reported if sound data to be transferred is not present on the PC side.

As a result, even if no data is transferred in response to a transfer request from the IEEE1394 audio device, the IEEE1394 audio device does not determine that the PC operation corresponding to the transfer request is abnormal, but processes on judgment that the PC has responded to the transfer request with a normal operation without imposing any extra task on the PC side.

A description is now made of the case of executing the data transfer in step S24 of FIG. 8 or in step S34 in FIG. 9 as mentioned above.

Transfer data, indicated by C22, received from the OS 51 by the device driver layer 4 shown in FIG. 5 is in the form of an asynchronous variable-length block. In an audio device or the like having an internal clock, data is generally transferred for each of blocks prepared by the OS 51. However, when data is transferred to the audio device as an IEEE1394 audio device, it is more efficient to transfer data in the form of a fixed-length block from the viewpoint of calculation of the transfer rate. Therefore, the input buffer 56 having a FIFO (Fast-In, First-Out) memory area is prepared in the device driver layer 4 to temporarily store data sent from the OS 51.

Figure 10:
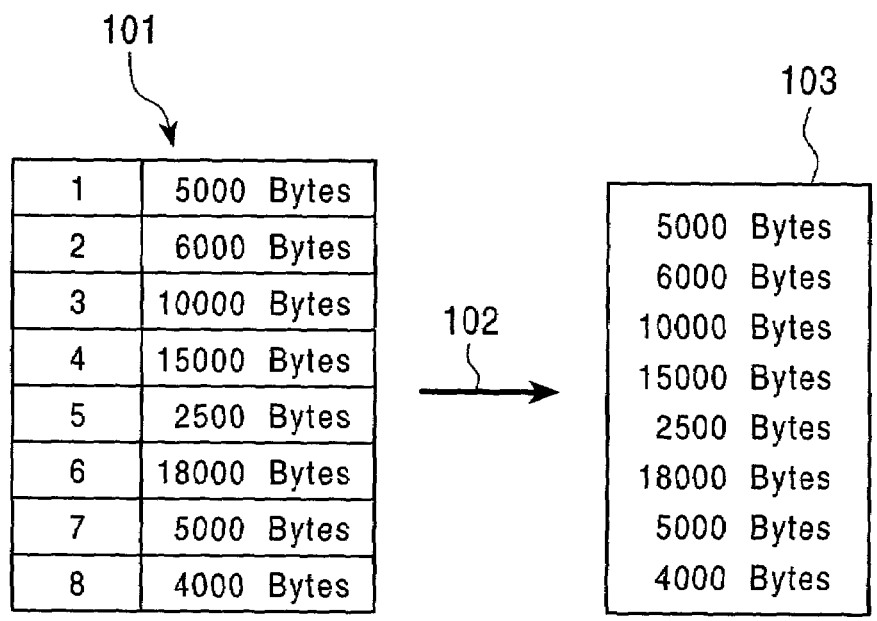
FIG. 10 represents data transfer executed upon a data transfer request.

FIG. 10 represents data transfer executed upon a data transfer request. In FIG. 10, data inputted from the OS 51 is transferred such that data in amount corresponding to eight blocks each received from the PC as a transfer data block 101 is transferred as indicated by 102 and stored in a PC-side FIFO memory 103 while being collected in one block.

Figure 11:
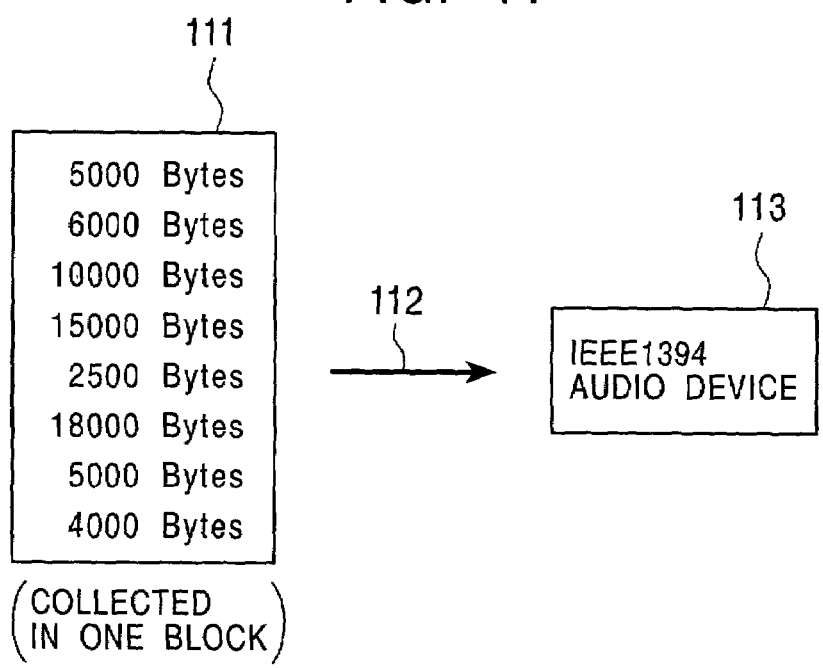
FIG. 11 represents data transfer to an IEEE1394 bus.

FIG. 11 represents data transfer to an IEEE1394 bus. In FIG. 11, the data stored in a PC-side FIFO memory 111 while being collected in one block is transferred in units of 35280 bytes, as indicated by 112, to an IEEE1394 audio device 113.

Calculation of the transfer rate will be described below. Under conditions satisfying CD sound quality, i.e., 16 bits, 2 channels (ch) and a sampling rate of 44.1 KHz, an amount of data (Byte) required for one second is given by the following numerical formula (1):

$$2(16\ bits=2\ Bytes) \times 2(ch) \times 44100\ (sampling\ rate) = 176400\ Bytes \quad (1)$$

Since isochronous transfer is employed for audio data, the data is transferred at timing of 0.125 msec. Therefore, the number of times at which the data can be transferred per sec is given by $1 \div 0.000125 = 8000$. Accordingly, there are 8000 transfer timings per sec. This means that a minimum amount of data which must be sent with one transfer is given by $176400 \div 8000 = 22.05$ Bytes, and data of 5 or 6 samples must be sent with one transfer as expressed by the following numerical formula (2):

$$22.05 \div (2(16\ bits) \times 2(ch)) = 5.5125 \quad (2)$$

Because $5.5125 \times 80 = 441$ is resulted from multiplying 5.5125 by 80 so that a multiple of 5.5125 becomes an integer, one cycle is completed with 441 samples (10 msec).

Here, 5 samples and 6 samples are distributed in one cycle as even as possible based on the following numerical formula (3):

$$441 \div (5+6) = about\ 40,\ hence\ (39 \times 5) + (41 \times 6) = 441 \quad (3)$$

Given 6 samples as A and 5 samples as B, one cycle represented by the following expression (4) provides optimum transfer so that 5 samples and 6 samples are transferred in a most evenly distributed manner:

ABABABABABABABABABABABABABABABABABABABAABAB

ABABABABABABABABABABABABABABABABABABABABA ...(4)

Figure 12:
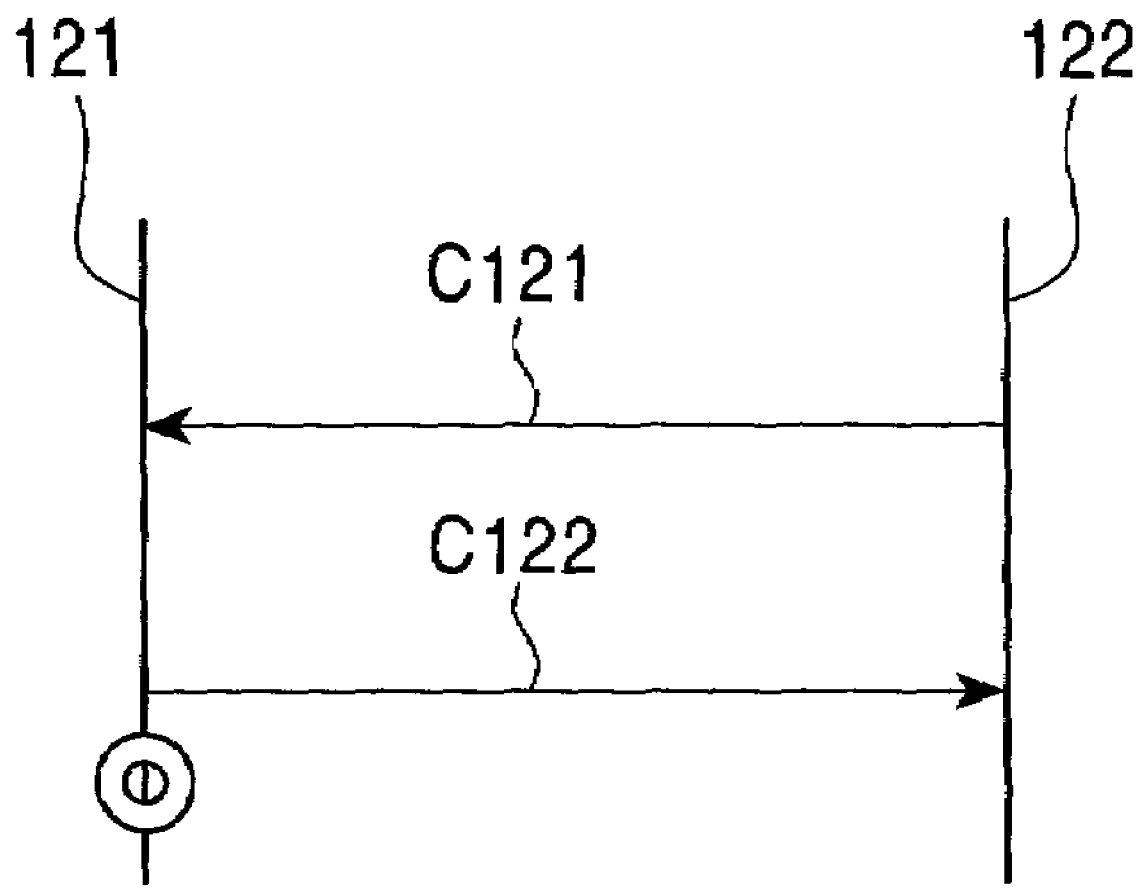
FIG. 12 is a chart showing switching-over of an input device, transfer permission, and power-on/off.

FIG. 12 is a chart showing switching-over of an input device, transfer permission, and power-on/off. In FIG. 12, an input device switching-over command C121 is supplied from an IEEE1394 audio device 122 to a personal computer 121, and an end-of-reception notice C122 is supplied from the personal computer 121 to the IEEE1394 audio device 122. Unless the fact that the personal computer 121 is in the power-off state is noticed to the IEEE1394 audio device 122 after the end-of-reception notice C122, audio data must be transmitted to the IEEE1394 audio device 122.

Until reaching a point in time indicated by a mark ⊙, therefore, the register value of the oPCR 59 shown in FIG. 5 must be changed to a value indicating audio data transfer from the personal computer 121 to the IEEE1394 audio device 122 when the data transfer is enabled, or to a value indicating the on-line or off-line state of the personal computer 121 itself when the data transfer is not enabled.

A PCR is a register embodying the concept of a plug and is mapped in an address space in conformity with CSR (Channel Status Register) architecture (ISO/IEC-13213) of IEEE1394. There is one PCR with respect to one plug. The PCR has an oPCR (output Plug Control Register) representing an output plug, an iPCR (input Plug Control Register) representing an input plug, and an oMPR (output Master Plag Register) and an iMPR (input Master Plug Register) representing information of the output plug and the input plug, respectively, specific to the relevant device.

Depending on the number of device plugs, the PCR is able to have oPCR and iPCR in number from 10 at minimum to 31 at maximum. The device must include one oMPR when it has oPCR, and one iMPR when it has iPCR. Various kinds of PCR are each a 32-bit register, the inside of which is divided into small fields.

FIG. 13 is a table showing a register oPCR (ffff f000 0904h–ffff f000 097Ch) indicating an on-line, off-line, transfer-enabled and transfer-disabled state.

In FIG. 13, "on-line" 131 is a register for declaring to the IEEE1394 audio device that the power is turned on or off. A register value "0" represents power-off and "1" represents power-on. The "on-line" 131 can be rewritten only by the device driver layer 4. The on-line plug implies a condition in which isochronous data transfer cannot be performed even when "connection" indicating connection of a signal route is established. The "connection" can be established regardless of whether the isochronous data transfer is enabled or not. Isochronous data is actually inputted or outputted with the plug in an active state where it is in the on-line state and the "connection" is established.

A broadcast connection counter 132 is one indicating whether there is connection for broadcast transfer. A counter value "0" represents the absence of connection and "1" represents the presence of connection. The broadcast connection counter 132 can be rewritten from both the device driver layer 4 and the IEEE1394 audio device sides. The broadcast connection does not designate a pair of the output plug and the input plug, but sets connection between the output plug and an isochronous channel or connection between the input plug and the isochronous channel.

A point-to-point connection counter 133 is a counter making it possible to determine whether the IEEE1394 audio device is in a state permitting transmission. A counter value "0 to 3f" represents the number of point-to-point connections. When the counter value is not lower than 1, this means that the IEEE1394 audio device permits data transfer. The point-to-point connection counter 133 can be rewritten from the IEEE1394 audio device side. The point-to-point connection forms a signal route in such a manner that it establishes coupling from the output plug to the input plug via one isochronous channel.

"Reserved" 134 is a reserved counter. The "reserved" 134 can be rewritten from both the device driver layer 4 and the IEEE1394 audio device sides.

"Channel number" 135 is a counter indicating the channel number used. A counter value "0 to 3f" represents the channel number used for isochronous transfer.

"Data rate" 136 is a counter indicating a transfer rate used in isochronous transfer. A counter value "00h" represents S100, "01h" represents S200, and "02h" represents S400.

"Overhead ID" 137 is a register for designating a communication overhead.

"Payload" 138 is a counter indicating a data size. A counter value "0 to 3ff" represents a quadlet size expressed by byte number=payload×4.

FIG. 14 is a table showing an overhead ID. In FIG. 14, when an overhead ID 141 is 0000h, IEEE1394 bandwidth allocation units 142 are given as 512. When the overhead ID 141 is 0001h, the IEEE1394 bandwidth allocation units 142 are given as 32. When the overhead ID 141 is 0010h, the IEEE1394 bandwidth allocation units 142 are given as 64. When the overhead ID 141 is 0011h, the IEEE1394 bandwidth allocation units 142 are given as 96. When the overhead ID 141 is 0100h, the IEEE1394 bandwidth allocation units 142 are given as 128. When the overhead ID 141 is 0101h, the IEEE1394 bandwidth allocation units 142 are given as 160. When the overhead ID 141 is 0110h, the IEEE1394 bandwidth allocation units 142 are given as 192. When the overhead ID 141 is 0111h, the IEEE1394 bandwidth allocation units 142 are given as 224.

Further, in FIG. 14, when an overhead ID 143 is 1000h, IEEE1394 bandwidth allocation units 144 are given as 256. When the overhead ID 143 is 1001h, the IEEE1394 bandwidth allocation units 144 are given as 288. When the overhead ID 143 is 1010h, the IEEE1394 bandwidth allocation units 144 are given as 320. When the overhead ID 143 is 1011h, the IEEE1394 bandwidth allocation units 144 are given as 352. When the overhead ID 143 is 1100h, the IEEE1394 bandwidth allocation units 144 are given as 384. When the overhead ID 143 is 1101h, the IEEE1394 bandwidth allocation units 144 are given as 416. When the overhead ID 143 is 1110h, the IEEE1394 bandwidth allocation units 144 are given as 448. When the overhead ID 143 is 1111h, the IEEE1394 bandwidth allocation units 144 are given as 480.

Change of a PCR value will be described below. A value of PCR in the relevant device itself and a value of PCR in another device connected via an IEEE1394 interface are both changed with compare-and-swap lock transaction. The PCR value is changed in accordance with the following conditions.

During a period in which the connection is established for the oPCR, a channel and a band must be secured as IEEE1394 isochronous resources.

Also, the channel number 135 and the data rate 136 of the oPCR must not be changed when the connection is established.

Further, the broadcast connection can be established only by the device having the relevant plug.

Moreover, when the connection is established for the output plug, the data rate 136, the overhead ID 137, the oPCR channel number 135, the broadcast connection counter 132, and the point-to-point connection counter 133 change values with the same compare-and-swap lock transaction.

FIGS. 15A and 15B are tables showing a packet example (Lock Request Transaction) issued when an IEEE1394 audio device gives transmission permission to a PC.

FIG. 15A represents a packet. Referring to FIG. 15A, Raw Packet "F0000904" at Byte 8 represents write into the oPCR, indicated by 151, and rewrites a value "0", indicated by 152, of Raw Packet "803F7C12" at Byte 20 to a value "1", indicated by 153, of Raw Packet "813E7C12" at Byte 24.

FIG. 15B represents details of the packet. Referring to FIG. 15B, "Destination ID" represents $node_{13}$ ID of the destination in packet transmission. Also, "tl" (transaction label) is a label for recognizing matching between a pair of transactions for a request packet and a response packet. The "tl" of the request packet is also used as the "tl" of the response packet.

Then, "rt" (retry code) represents information about a retry method to be executed when a busy acknowledgement is received. Further, "tcode" (transaction code) represents a type code for a transaction packet, and indicates which one of read/write/lock, quadlet/block, and request/response is used.

Moreover, "pri" (priority) is given by a110 (except for cycle start) in fair arbitration. "Source_ID" (source identifier) represents node_ID of the source in packet transmission.

"Destination_Offset" indicates a 48-bit objective address in a register space at the node of the destination in packet transmission, and represents read/write for oPCR.

"Data_Length" represents a data payload length (byte) when a packet has a data payload. "Extended_tcode" has a meaning only for a lock packet, and represents the lock type. "Header_CRC" is CRC for header information. "Data" is a data payload. "Data_CRC" is CRC for the data payload.

FIGS. 16A and 16B are tables showing a packet example (Lock Request Transaction) issued when the PC replies to a transmission permission packet from the IEEE1394 audio device. FIG. 16A represents a packet and FIG. 16B represents details of the packet.

A description is now made of a mechanism for the lock transaction. The lock transaction employs three kinds of values, i.e., arg_value, data_value and old_value, as write parameters, and also employs a compare-and-swap writing method for rewriting of the oPCR. A write sequence is executed as follows.

First, a requester (audio device) creates a request packet in which a current value of a register for writing is designated as arg_value and a value to be written is designated as data_value, and then transmits the request packet to a responder (personal computer (PC)).

Secondly, the responder (personal computer (PC)) compares arg_value of the received request packet with the current value of the register. If both the values are equal to each other, the responder changes the register value to data_value, and if they are not equal to each other, it does not change the register value. Thereafter, the responder creates a response packet in which the register value at the time of receiving the request packet is designated as old_value, and then transmits the response packet to the requester (audio device).

Thirdly, the requester (audio device) compares old_value of the received response packet with arg_value transmitted from itself. If both the values are equal to each other, the requester judges that the writing has succeeded, and if they are not equal to each other, it judges that the writing has failed.

Figure 17A:
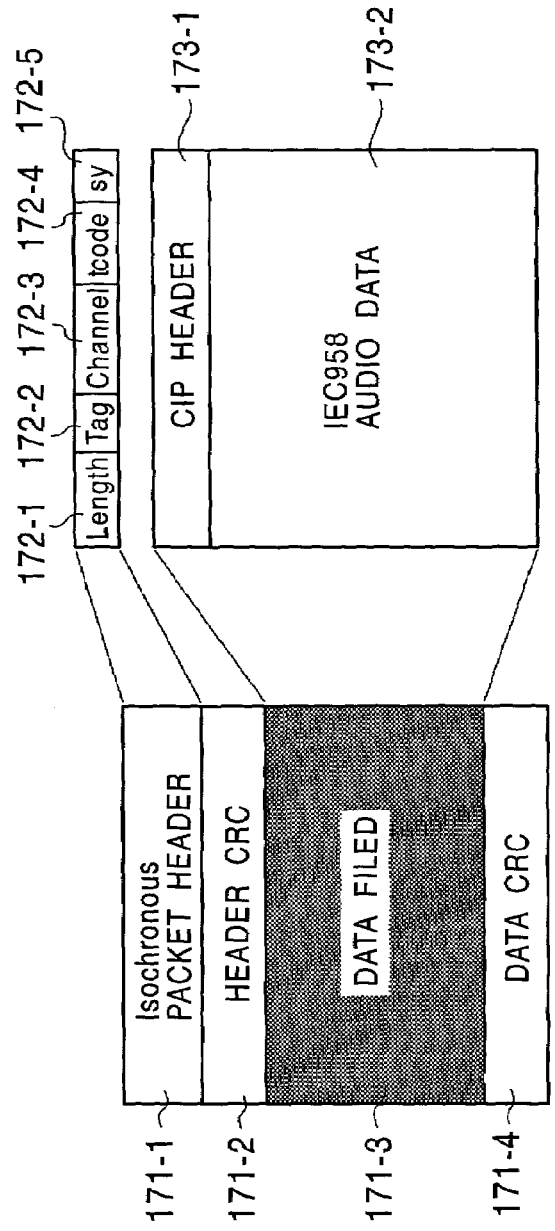
Figure 17B:
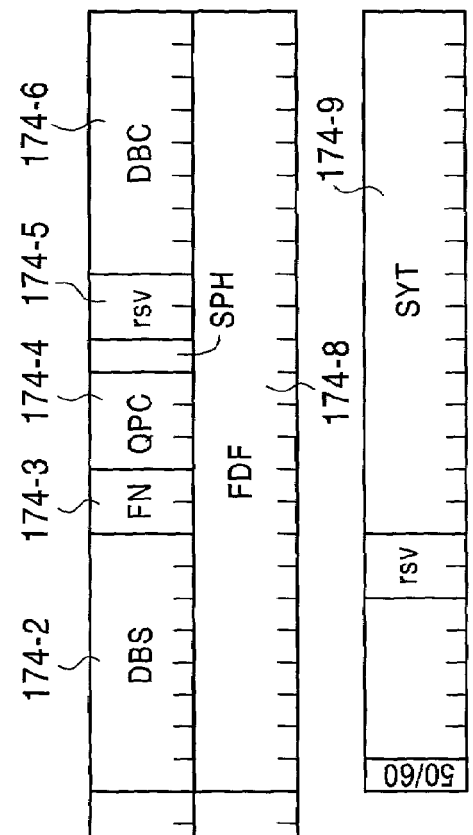

FIGS. 17A and 17B show an isochronous packet including a data section and used in one example of a command for changing an input source.

An isochronous header 171-1 shown in FIG. 17A will be first described.

"Length" 172-1 represents a data length that is made up of a CIP header section 173-1 and an IEC958 audio data section 173-2 in a data field 173-1. The CIP header 173-1 indicates a section sandwiched between "Header CRC" 171-2 and "Data (Sample1)", and the IEC958 audio data 173-2 indicates a section ranging from "Data (Sample1)" to "Data (Sample5)". At the header end, data CRC 171-4 is added.

"Tag" (isochronous data format tag) 172-2 represents an isochronous packet format. "Channel" 172-3 represents a channel used for identifying a packet. Also, "tcode" (transaction code) 172-4 represents a code (isochronous is denoted by "Ah") indicating the packet type. Further, "sy" (synchronization code) 172-5 is used for transferring synchronization information, such as video and voice, between a transmitting node and a receiving node.

In the CIP header shown in FIG. 17B, "SID" 174-1 represents an ID of a node transmitting a packet. "DBS" 174-2 represents a size of one divided data block. "FN" 174-3 represents the number of divisions at which one source packet is divided in data block size. "QPC" 174-4 represents the number of quadlets added for division. "SPH" 174-5 represents whether a source packet header is added (=1) or not. "DBC" 174-6 represents a continuous counter for data blocks and is used for detecting, e.g., omission of a packet. "FMT" 174-7 represents an area indicating which format a packet has. "FDF" 174-8 represents "Basic Format for AM824". "SYT" 174-9 represents a field in which time information used for synchronization is inserted to achieve data synchronization between transmission and reception. A unit of time is on the basis of a cycle counter.

FIG. 18 is a table showing details of a data section of a command for changing an input source sent from the PC to the audio device. The data section in FIG. 18 corresponds to the IEC958 audio data 173-2 shown in FIG. 17B.

Referring to FIG. 18, the data section includes "ZERO" 181 and "Preamble" 182. "Parity" 183 provided thereafter takes 0 when the sum of values from the 5-th bit to 32-th bit is an even number, and takes 1 when the sum is an odd number.

"Channel" 184 is data expressed by 192 samples and represents packet characteristics of 1 bit×192 packets =24 bytes. "User" 185 takes 1 when a data channel is formed within the same sub-frame, and takes 0 when a data channel is not formed within the same sub-frame.

"Varidate" 186 takes 0 when data "Aux" is effective (24-bit data field), and takes 1 when the data "Aux" is ineffective (20-bit data field).

Note that the data transfer has been described above by taking as an example a communication method in conformity with the IEEE1394 standard, the present invention is not limited to the illustrated embodiment, but may utilize any other suitable communication method.

What is claimed is:

1. A data communicating device for transmitting time-continuous data in units of a predetermined data amount to another device connected to a network, the data communicating device comprising:
    buffer means for temporarily holding the time-continuous data;
    timer means for reading the time-continuous data from said buffer means at predetermined intervals;
    communicating means for transmitting the time-continuous data to the another device via the network;
    data holding means for holding status data received from the another device via said communicating means, the status data including status information of the another device;
    held-value determining means for determining whether the status data held in said data holding means includes a predetermined value; and
    control means for discarding a predetermined amount of the time-continuous data held in said buffer means at predefined intervals counted by said timer means when said held-value determining means determines that the status data held in said data holding means includes the predetermined value.

2. The data communicating device according to claim 1, wherein
    said timer means counts time during 20 msec cycles, and the time-continuous data is discarded in amounts each corresponding to 20 msec of the time-continuous data.

3. A data communicating device for transmitting time-continuous data in units of a predetermined data amount to another device connected to a network, the data communicating device comprising:
    buffer means for temporarily holding the time-continuous data;
    timer means for reading the time-continuous data from said buffer means at predetermined intervals;
    communicating means for transmitting the time-continuous data to the another device via the network;
    data holding means for holding status data received from the another device via said communicating means;
    held-value determining means for determining whether the status data held in said data holding means includes a first predetermined value; and
    control means for discarding a predetermined amount of the time-continuous data held in said buffer means at predetermined intervals counted by said timer means when said held-value determining means determines that the status data held in said data holding means includes the first predetermined value,
    wherein said control means controls said communicating means to transmit, to the another device via the network, a predetermined amount of the time-continuous data held in said buffer means at intervals counted by said timer means when said held-value determining means determines that the status data held in said data holding means is a second predetermined value different from the first predetermined value.

4. The data communicating device according to claim 1, wherein the time-continuous data is audio data.

5. The data communicating device according to claim 1, wherein the network is in conformity with IEEE1394.

6. A data communicating device for transmitting time-continuous data in units of a predetermined data amount to another device connected to a network, the data communicating device comprising:

buffer means for temporarily holding the time-continuous data;

timer means for reading the time-continuous data from said buffer means at predetermined intervals;

communicating means for transmitting the time-continuous data to the another device via the network, data holding means for holding status data received from the another device via said communicating means;

held-value determining means for determining whether the status data held in said data holding means includes a predetermined value;

control means for discarding a predetermined amount of the time-continuous data held in said buffer means at predetermined intervals counted by said timer means when said held-value determining means determines that the status data held in said data holding means includes the predetermined value; and silence data generating means for generating silence data to be substituted for the time-continuous data, wherein, prior to transmission of the time-continuous data, said control means transmits the silence data for a predetermined time to the another device via the network.

7. The data communicating device according to claim 1, further comprising accumulated-amount determining means for determining an amount of the time-continuous data accumulated in said buffer means, wherein said control means evaluates the status data obtained from said held-value determining means and data obtained from said accumulated-amount determining means prior to discarding the predetermined amount of the time-continuous data.

8. The data communicating device according to claim 1, wherein said data communicating device performs data transmission of the time-continuous data inputted from a personal computer.

9. A data communicating method for transmitting time-continuous data in units of a predetermined data amount from a data communicating device having data holding means and a buffer containing the time-continuous data to another device connected to a network, the method comprising the steps of:

reading from the data holding means status data received from the another device via the network, the status data including status information of the another device;

determining whether the status data includes a predetermined value; and discarding a predetermined amount of the time-continuous data at predetermined intervals from the buffer when the status data includes the predetermined value.

10. The data communicating method according to claim 9, wherein the predetermined intervals, at which the time-continuous data is discarded, are given as cycles of 20 msec.

11. The data communicating method according to claim 9, wherein the predetermined amounts each correspond to 20 msec of the time-continuous data.

12. A data communicating method for transmitting time-continuous data in units of a predetermined data amount from a buffer in a communicating device to another device connected to a network, the method comprising the steps of:

reading status data from data holding means, the status data being received from the another device via the network;

determining whether the read status data includes a predetermined value;

discarding a predetermined amount of the time-continuous data held in the buffer at predetermined intervals when the read status data is determined to include the predetermined value; and transmitting, to the another device via the network, a predetermined amount of the time-continuous data held in the buffer at intervals of a predetermined time when the read status data differs from the predetermined value.

13. A data communicating method for transmitting time-continuous datain units of a predetermined data amount from a buffer in a communicating device to another device connected to a network, the method comprising the steps of:

reading status data from data holding means, the status data being received from the another device via the network;

determining whether the read status data includes a predetermined value;

discarding a predetermined amount of the time-continuous data held in the buffer at predetermined intervals when the read status data is determined to include the predetermined value; and transmitting, prior to transmission of the time-continuous data, silence data for a predetermined time to the another device via the network.

14. The data communicating method according to claim 9, wherein the time-continuous data is audio data.

15. The data communicating method according to claim 9, wherein the network is in conformity with IEEE1394.

16. The data communicating method according to claim 9, wherein the status data is read from the data holding means when an amount of the time-continuous data accumulated in the buffer exceeds a predetermined threshold.

17. The data communicating method according to claim 9, wherein the data communicating method performs data transmission of the time-continuous data received from a personal computer.

18. The data communicating method according to claim 9, wherein the time-continuous data is video data.

19. The data communicating device according to claim 1, wherein said control means allows said communicating means to transmit to the another device the predetermined amount of the time-continuous data held in said buffer means at the predefined intervals counted by said timer means when said held-value determining means determines that the status data held in said data holding means includes another predetermined value which is different from the predetermined value.

20. The data communicating device according to claim 1, further comprising silence data generating means for generating silence data and for substituting the silence data for the time-continuous data, wherein, prior to transmission of the time-continuous data, said control means transmits the silence data to the another device for a predetermined time.

21. The data communicating method according to claim 9, further comprising the step of transmitting from the buffer to the another device the predetermined amount of the time-continuous data during the predetermined intervals when the status data read from the data holding means differs from the predetermined value.

22. The data communicating method according to claim 21, further comprising the step of transmitting silence data to the another device prior to transmission of the time-continuous data.

* * * * *

UNITED STATES PATENT AND TRADEMARK OFFICE
CERTIFICATE OF CORRECTION

PATENT NO. : 7,130,906 B2 Page 1 of 1
APPLICATION NO. : 10/127620
DATED : October 31, 2006
INVENTOR(S) : Ryuta Miyoshi, Yuji Ogihara and Tomomasa Kojo It is certified that error appears in the above-identified patent and that said Letters Patent is hereby corrected as shown below:

On Title Page
In the Abstract, item 57, Lines 4-5, "whereby matching in temporal relationship with respect to data received by another device is realized." should read --where data is received, with a matching temporal relationship, by another device.--;

Column 11, Line 53, "(1)" should read -- . . .(1)--;
Column 11, Line 64, "(2)" should read -- . . .(2)--;
Column 12, Line 5, "(3)" should read -- . . .(3)--;
Column 17, Line 46, ";" should read --:--;
Column 17, Line 67, "," should read --;--.

Signed and Sealed this

Eleventh Day of September, 2007

JON W. DUDAS
*Director of the United States Patent and Trademark Office*